(12) United States Patent
Kiene et al.

(10) Patent No.: US 7,487,693 B2
(45) Date of Patent: Feb. 10, 2009

(54) SHIFTING DEVICE

(75) Inventors: Klaus Kiene, Langenlonsheim (DE); Arnold Trissler, Herzogenaurach (DE)

(73) Assignee: Ina Shaeffler KG (DE)

( * ) Notice: Subject to any disclaimer, the term of this patent is extended or adjusted under 35 U.S.C. 154(b) by 494 days.

(21) Appl. No.: 10/548,136

(22) PCT Filed: Feb. 14, 2004

(86) PCT No.: PCT/EP2004/001404

§ 371 (c)(1),
(2), (4) Date: Nov. 4, 2005

(87) PCT Pub. No.: WO2004/081419

PCT Pub. Date: Sep. 23, 2004

(65) Prior Publication Data

US 2006/0156849 A1 Jul. 20, 2006

(30) Foreign Application Priority Data

Mar. 10, 2003 (DE) .................. 103 10 277

(51) Int. Cl.
*B60K 20/00* (2006.01)
*F16H 59/04* (2006.01)

(52) U.S. Cl. .................. 74/473.36; 74/473.25

(58) Field of Classification Search ............ 74/473.21, 74/473.24, 473.25, 473.36, 473.37; 384/49

See application file for complete search history.

(56) References Cited

U.S. PATENT DOCUMENTS

| | | | |
|---|---|---|---|
| 2,928,702 A | 3/1960 | Pitner | 308/236 |
| 4,621,537 A * | 11/1986 | Piazza et al. | 74/473.24 |
| 5,809,836 A * | 9/1998 | Patzold et al. | 74/337.5 |
| 6,357,316 B1 | 3/2002 | Bieber | 74/473.24 |
| 6,845,685 B2 * | 1/2005 | Brandwitte et al. | 74/473.25 |
| 7,162,934 B2 * | 1/2007 | Fanning et al. | 74/473.25 |

FOREIGN PATENT DOCUMENTS

| | | |
|---|---|---|
| CH | 342092 | 12/1959 |
| DE | 1 009 862 | 6/1957 |
| DE | 198 16 385 A1 | 10/1999 |
| EP | 0 383 493 B1 | 8/1990 |

OTHER PUBLICATIONS

German search report dated Mar. 10, 2003.
International Search Report dated Jul. 7, 2004.

* cited by examiner

*Primary Examiner*—Richard W L Ridley
*Assistant Examiner*—Phillip Johnson
(74) *Attorney, Agent, or Firm*—Ostrolenk, Faber, Gerb & Soffen, LLP

(57) ABSTRACT

A shifting device including at least one shifting element secured axially on the shaft longitudinally in at least one direction of extension of the longitudinal axis of the shaft by a bearing element on the shaft. The shifting element has transversely projecting fingers.

12 Claims, 3 Drawing Sheets

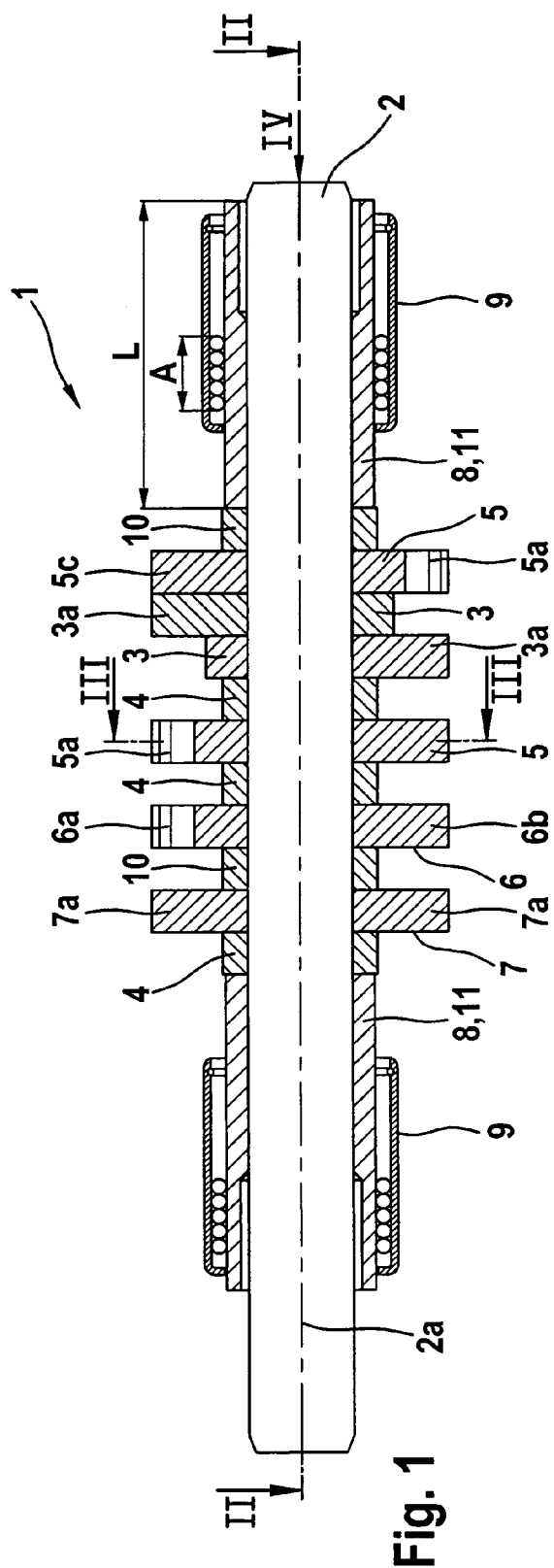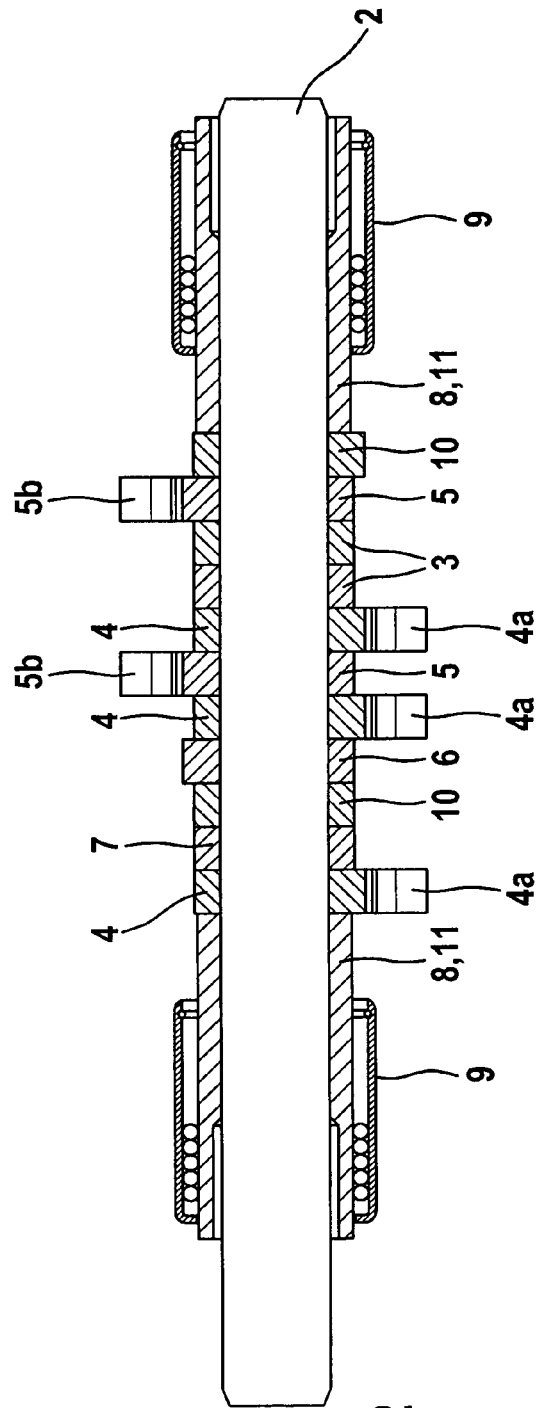

SHIFTING DEVICE

CROSS REFERENCE TO RELATED APPLICATION

The present application is a 35 U.S.C. §§ 371 national phase conversion of PCT/EP2004/001404, filed 14 Feb. 2004, which claims priority of German Application No. 103 10 277.9, filed 10 Mar. 2003. The PCT International Application was published in the German language.

FIELD OF THE INVENTION

The invention relates to a shifting device with at least one shifting element on a shaft, the shifting element protruding transversely from a longitudinal axis of the shaft away from the shaft in at least one direction, and the shifting element being fixed longitudinally on the shaft and extending in mutually opposite directions from the longitudinal axis. The shaft is supported directed transversely with respect to the longitudinal axis in at least one bearing and is mounted moveably here in the bearing.

BACKGROUND OF THE INVENTION

A shifting device of this type is described in DE 198 16 385. The shifting device has two of the shifting elements on a shifting shaft. One of the shifting elements is a slide and the other is a shifting finger. The slide is rotatable relative to the shifting shaft about the longitudinal axis of the shifting shaft. The shifting finger is fixed about the longitudinal axis on the shifting shaft in the pivoting directions of the shifting shaft. The shifting elements are fixed axially on the shifting shaft in the directions of extension of the shifting shaft by means of securing rings. These securing elements are opposite one another on the shifting shaft and hold the "package" of the shifting elements longitudinally between them, the shifting elements being moveable in position with respect to one another about the longitudinal axis. The shifting shaft is mounted in the shift transmission by means of two bearings in a manner such that it can be displaced axially in the directions of extension of the longitudinal axis and also such that it is pivotable radially about the longitudinal axis, i.e. is supported transversely with respect to the longitudinal axis of the shaft. In this application, the bearings are sliding bearings in the form of sliding bushings. Shifting shafts of this type are frequently also mounted by means of rolling contact bearings. In such a case, in the application under consideration above, a combined linear and rotary rolling contact bearing or a combined linear sliding bearing in conjunction with a rotary rolling contact bearing is to be used.

SUMMARY OF THE INVENTION

It is the object of the invention, in a shifting device of the generic type, to fix the shifting elements on a shaft in the directions of extension of the shaft in such a manner that as low costs as possible arise in the production of a device of this type. In this case, the costs for the production of the individual parts in the device, the number of components used in the device and the outlay for the assembly of the device are to be reduced as much as possible.

The object is achieved by securing the shifting element longitudinally in at least one of the directions of extension by a bearing element of the bearing, which bearing element is moveable in the bearing. The bearing element engages around the longitudinal axis and is seated fixedly on the shaft. The fixed seating of the bearing element on the shaft means that the shifting element is therefore secured axially on the shaft. In the arrangement according to the invention, at least one shifting element which is at least pivotable but is also rotatable about the longitudinal axis with respect to the shaft is held axially on the shaft. As an alternative to this, according to one refinement of the invention, the shifting element is seated on the shaft such that it is fixed in rotation with respect to the shaft.

A shifting element which is pivotable on the shaft is, for example, a pivoted lever with one or more pivoting arms. Each of the pivoting arms extends from the longitudinal axis in a different direction from the other pivoting arm of the pivoting arms. The pivoted lever, which is pivoted by means of a shifting element, transmits shifting movements to a further shifting element. In this case, shifting forces or shifting displacements are reduced or increased by the pivoted lever as a function of the distance of the pivoting arms from the longitudinal axis to the particular shifting element. In this application, the shaft is the pivot axis for the pivoted lever. In addition, the shaft is mounted pivotably about the longitudinal axis in the bearing and/or is mounted in a longitudinally moveable manner together with the pivoted lever for other purposes.

Furthermore, there are shifting elements which are not seated such that they are rotationally fixed (free from rotation) on the shaft, but are held on the surrounding structure to the shifting device such that they are rotationally fixed about the longitudinal axis relative to the shaft and to the shift transmission. In this case, the shaft is rotatable in the seat of the shifting element relative to the shifting element, which is immoveable with respect thereto.

For a shifting element protruding transversely from the shaft on one side in the manner of a lever, for a shifting element with two or more pivoting arms and for a shifting element formed in a rotationally symmetrical or eccentric manner about the shaft, one refinement of the invention makes provision for the shifting element, which is fixed axially on the shaft by means of the bearing element, to engage in the shaft in a form-fitting manner. In this case, the form-fitting connection with the shaft in the rotational or pivoting direction about the longitudinal axis is provided by means of a profiled shaft and hub connection. The shifting element is therefore fixed on the shaft and can either be pivoted or rotated with the shaft or can be displaced with a shaft which is only moveable longitudinally. The cross section of the shaft differs here in general from the round cross-sectional form. The shaft is, for example, flattened or is a polygonal profile. As an alternative to this, the shaft is provided on the circumference with longitudinal grooves/key grooves or with a serration and the like. The key grooves run parallel to the longitudinal axis. A shaft used in the device according to the invention is produced preferably by extrusion.

The shifting element has a hub-like base, a hub or an eye with which it engages around the shaft or with which it is seated on this shaft. The contour of the eye in the hub is matched to the outer contour of the shaft in cross section. For example, at least one or preferably a plurality of keys or projections of wedge-shaped design which are formed integrally with the shifting element and are directed inward from the hub into the eye protrude from the hub in the direction of the longitudinal axis. As an alternative to this, the base, which is of hub-shaped design, or the hub is provided with at least one of the key grooves which in each case lies radially opposite one of the key grooves on the shaft. In this case, the form-fitting connection is produced by one or more feather keys placed between the shaft and the shifting element into the key grooves or by one or more keys. The key corresponds with the longitudinal groove in a form-fitting manner at least in the circumferential direction.

A further refinement of the invention makes provision for the device to have at least two or more of the shifting elements. It is thus conceivable, for example, for a shifting shaft for a five-speed transmission or a six-speed transmission to have five or six or more of the shifting elements. The shifting elements are either identical or different from one another with regard to their design and function. It is thus conceivable that either, as in the previously described device of the prior art, one or more shifting elements are slides and shifting fingers. The shifting elements are at least pivotable together or each on its own on the shifting shaft or together with the shifting shaft about the longitudinal axis, but are optionally also fixed. As an alternative to this, at least one of the shifting elements jointly fixed axially by means of the bearing element is arranged pivotably on the shifting shaft while at least another of these shifting elements is fixed on the shaft in a rotationally fixed manner.

The shifting elements are arranged directly adjacently on the shaft or are arranged adjacently on the shaft separated from one another by, for example, a spacer element or other components of the transmission that are seated on the shaft. For the shifting elements which are rotatable or pivotable about the longitudinal axis relative to the shaft, a form-fitting connection to the shaft in the pivoting direction is not provided in this case. The grooves or flattened portions etc. on the shaft are preferably at least as long in the directions of extension as the width (in the direction of the bearing element) of the entire component package to be fixed axially by the bearing element. As an alternative to this, the shaft has a cross section deviating from the circular shape at least only in the regions in which a form-fitting connection to individual shifting elements of the shifting elements is produced.

During the assembly of the shifting elements, the shifting elements and, if appropriate, other components are pushed (threaded) individually onto the shaft and are fixed by means of one or else two of the bearing elements. Shifting elements fixed axially by means of only one bearing element are supported in the axial direction, which points away from the bearing element, on a shaft shoulder, for example. Two of the bearing elements hold the shifting elements and, if appropriate, other components longitudinally between them.

Provision is furthermore made for the shifting elements to be of identical design at least with regard to the number and the geometry of the form-fitting elements, but also in their entirety. The use of identical parts for producing a device of this type has advantages. The number of manufacturing devices is reduced. The outlay on storage and transportation and the outlay on assembly of the components on the shaft is reduced. There is no possibility of confusion, as may occur in the sequence and alignment of shifting elements of similar design to one another when they are being assembled on the shaft.

One refinement of the invention takes into consideration the fact that at least one of the shifting elements is directed away transversely from the longitudinal axis in a first direction and that at least one further of the shifting elements is directed away transversely from the longitudinal axis in a second direction differing from the first direction. This is to be based on the fact that, if there are a plurality of shifting elements, at least some, if not each of the shifting elements, protrude transversely from the shaft in a different direction. The form-fitting elements, such as keys, are arranged with respect to one another at the same pitch about the longitudinal axis preferably from shifting element to shifting element and preferably also on a hub of a shifting element itself. It is therefore possible that a plurality of these components then protrude on a shaft, for example with three of the longitudinal grooves, in three and more different directions to one another, on a shaft with four of the longitudinal grooves, in four and more different directions to one another and on a shaft with five and more grooves, in five different directions to one another, etc.

According to one refinement of the invention, at least one shifting finger is provided on a shifting element which is fixed with respect to the shaft. The shifting finger protrudes on one side from the shaft and is moved together with the shaft by means of rotation and/or displacement of the shaft. The shifting finger pivoting together with the shaft or the shifting finger displaced with the shaft in the directions of extension of the longitudinal axis convert shifting or selection movements initiated at the shaft into, for example, longitudinal movements on shift rails, shift forks or the like.

The shaft is, for example, a shifting shaft or a pivoting bolt and is supported in the bearing in a manner directed transversely with respect to the longitudinal axis and, as an alternative, depending in each case on the use, is mounted moveably with different degrees of freedom in at least one bearing:

a) the shaft is rotationally fixed with respect to the bearing and is moveable longitudinally in the directions of extension of the longitudinal axis, b) the shaft is fixed in the directions of extension of the longitudinal axis and is at least pivotable about the longitudinal axis or, alternatively, is rotatable about the longitudinal axis, c) the shaft is both pivotable, or alternatively rotatable, about the longitudinal axis and is also moveable longitudinally in the directions of extension.

As one refinement of the invention envisages, the bearing element is an inner ring of a radial bearing. The radial bearing is preferably a roller bearing or needle bearing, with the result that the inner ring has on the circumference a track for trochoidal rolling contact bodies, such as rollers or needles. As an alternative to this, the bearing element is an inner sleeve of a linear bearing for a mounting of the shaft that is moveable longitudinally in the directions of extension. Furthermore, provision is made for the bearing element to be an inner sleeve or an inner ring of a combined linear and rotary bearing. With a bearing of this type, the shaft is mounted in a manner such that it can move longitudinally in the directions of extension and such that it is at least pivotable, alternatively rotatable, about the longitudinal axis. The inner ring is of rotationally symmetrical design and is preferably seated on the shaft with a press fit. The inner sleeve is preferably produced by cold forming of sheet metal and is fastened on the shaft in a form-fitting manner, or alternatively by means of a press fit. Balls are preferably provided as the rolling contact bodies in the linear bearing and in the combined bearing. The use of a sliding ring, a sliding bearing or of a correspondingly stably reinforced sliding bushing with a seat on the shaft is likewise conceivable.

The shaft with the degrees of freedom according to variants a) to c) is held either in the bearing or outside the bearing in a rotationally fixed manner or fixed longitudinally with respect to the surroundings, for example in a bearing eye of a shift transmission. If the shaft is held in the bearing in a rotationally fixed manner, then, for example, the inner ring or the inner sleeve has, at least on the outside, a cross section differing from the circular form. The inner ring or the sleeves according to variants b) and c) in the bearing and the inner rings for shafts fixed outside the bearing according to variant a) are, for example, of cylindrical design, at least on the outside. If the shaft according to the variant b) is fixed in the bearing at least in one of the directions of extension, it is conceivable for the inner ring or the sleeve to have for this purpose on the outside one or two radially outwardly directed flanges which reach behind the rolling contact bodies. In this case, the rolling contact bodies are balls or rollers or needles. It is also conceivable for the sleeves or inner rings used in linear bearings or in the combined bearings to have a radially outwardly directed flange or similar means with which the shaft travel in the directions of extension is fixed.

The advantage of this invention is that the bearing elements, such as bearing rings and sleeves, are provided with a dual function. These firstly fix the bearing elements and in the process absorb axial forces, for example shifting forces. Secondly, the bearing elements are used as tracks for the bearings, by means of which the shaft is mounted. Additional securing rings or similar retaining elements to those conventionally used are omitted. The outlay on the production of the components and on the assembly of the components to form the device is reduced.

BRIEF DESCRIPTION OF THE DRAWINGS

In the drawings:

FIG. 1 shows an exemplary embodiment of a shifting device, which is mounted with combined bearings in a manner such that it can move rotationally and linearly, in longitudinal section, FIG. 2 shows a further longitudinal section of the device according to FIG. 1, sectioned along the line II-II.

DETAIL DESCRIPTION OF THE DRAWINGS

Figure 3:
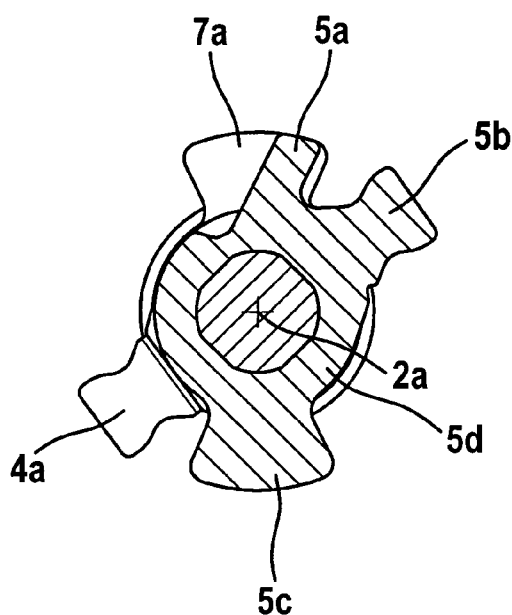
FIG. 3 shows the device according to FIG. 1 sectioned transversely along the line III-III.

FIG. 1 and FIG. 2 illustrate a shifting device 1 sectioned longitudinally. The shifting device 1 is formed from a shaft 2, from shifting elements 3, 4, 5, 6 and 7, from the bearing elements 8 and the bearings 9. As is also apparent from FIGS. 3 and 4, the shifting elements 3 to 7 are punched parts, which are designed in the manner of levers, emerging from the shifting finger at a hub.

Figure 4:
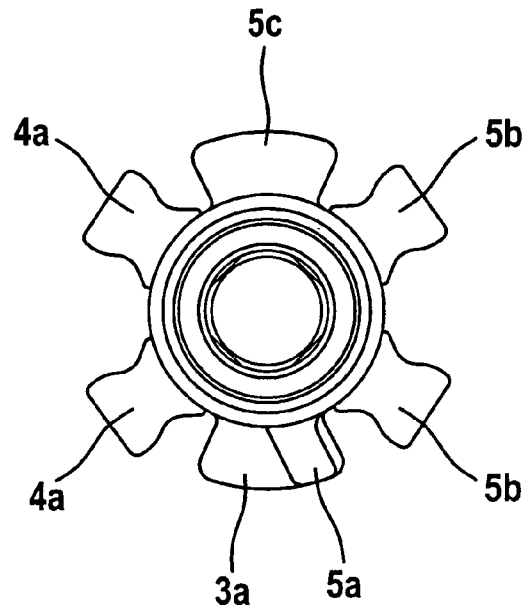
FIG. 4 shows a frontal view of the device according to FIG. 1 from the direction indicated by IV.

FIG. 3 illustrates the cross section of the shifting element 5. Each of the shifting elements 3 to 7 engages around the shaft 2 in a form-fitting manner with a hub similar to the hub 5d of the shifting element 5. From the hub 5d, the shifting fingers 5a, 5b and 5c are directed away radially from the longitudinal axis 2a of the shaft 2 in different directions.

Of the shifting elements 5, two are arranged on the shaft 2 in a mirror-inverted manner with respect to each other and pointing in different directions with the shifting fingers 5a, 5b, 5c. Two shifting elements 3 are directly adjacent to each other and each have a shifting finger 3a. The shifting finger 3a is designed as per the shifting finger 5c. The shifting elements 3 are adjoined on one side by a shifting element 5 and on the other side by a shifting element 4. Three of the shifting elements 4 are seated on the shaft 2 separated from one another by a shifting element 6, a spacer element 10 and a shifting element 7, or are adjacent to the shifting element 5. A respective shifting finger 4a is formed on the shifting elements 4. The shifting element 6 has two shifting fingers 6a and 6b of which the shifting finger 6a is in the shape of the shifting finger 5a and the shifting finger 6b is in the shape of the shifting finger 5c. The shifting element 7 is provided with two shifting fingers 7a which point away from each other and the design of which corresponds to that of the shifting finger 5c.

Figure 5:
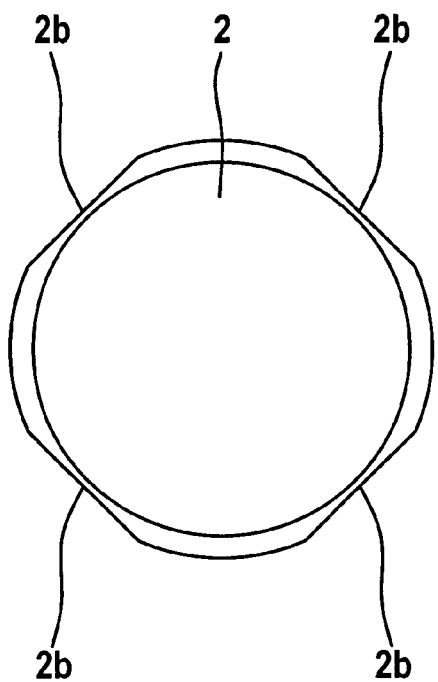
FIG. 5 shows the frontal view of the shaft from the device according to FIG. 1.

The hub 5d engages around the shaft 2 in the circumferential direction in a form-fitting manner about the longitudinal axis 2a. For this purpose, the shaft 2, which is of rotationally symmetrical design, is, as illustrated in FIG. 5, flattened in cross section with four side surfaces 2b and is, as illustrated in FIG. 3, engaged around in a form-fitting manner by the hubs of the shifting elements 3 to 7.

The shifting elements 3 to 7 are secured axially on the shaft in the directions of extension of the longitudinal axis 2a by means of the bearing elements 8. The bearing elements 8 are hollow-cylindrical inner rings 11 of the bearings 9. The bearing 9 is a combined bearing for a mounting 2 which is moveable longitudinally in the directions of extension of the longitudinal axis and also is at least pivotable about the longitudinal axis 2a. In this case, the length L of each of the inner rings 11 is at least as large as the supporting width A of the bearing 9 plus the travel by which the shaft 2 is displaceable in the directions of extension.

Figure 6:
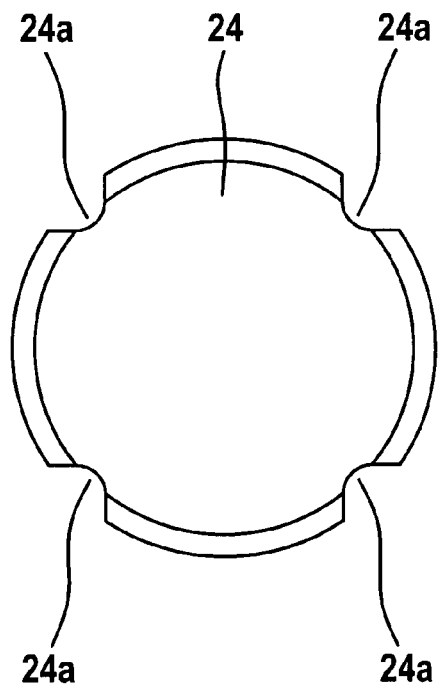
FIG. 6 shows a shaft designed as an alternative to the shaft according to FIG. 5.
Figure 7:
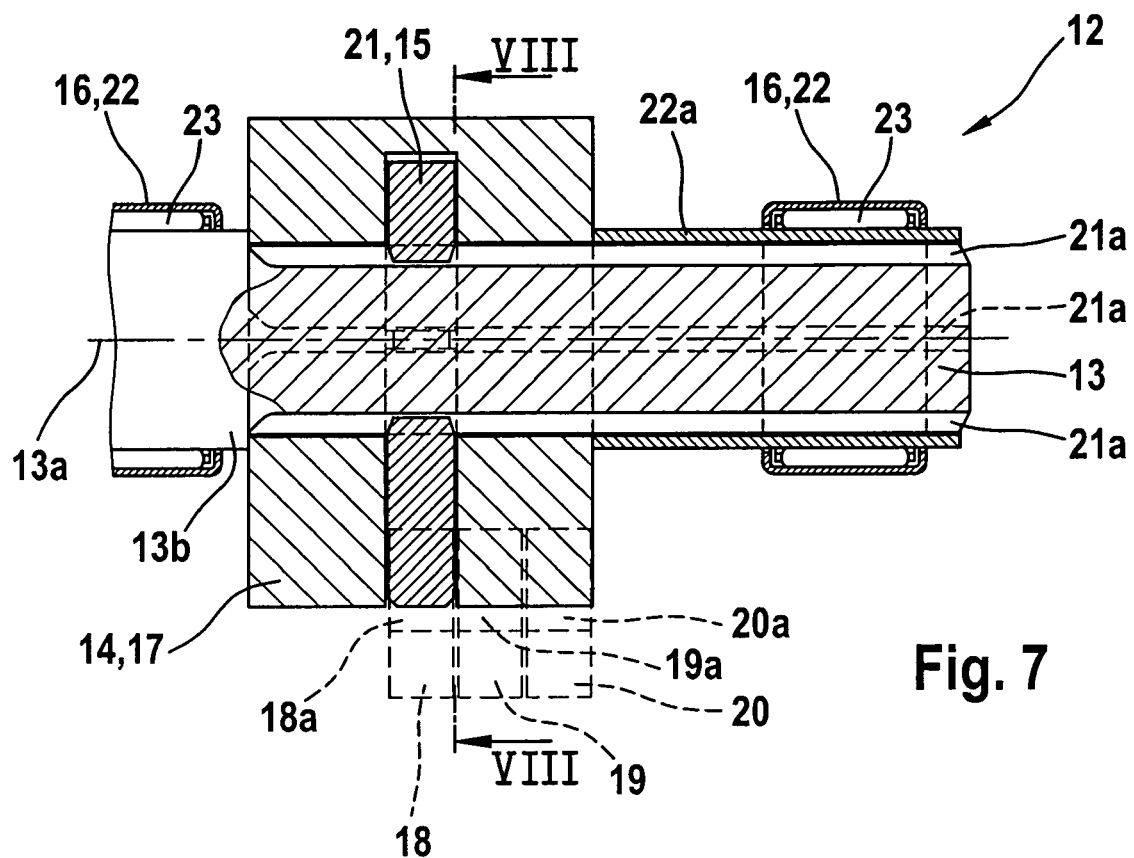
FIG. 7 shows a further exemplary embodiment of a shifting device according to the invention, which is mounted by means of radial bearings, in longitudinal section.
Figure 8:
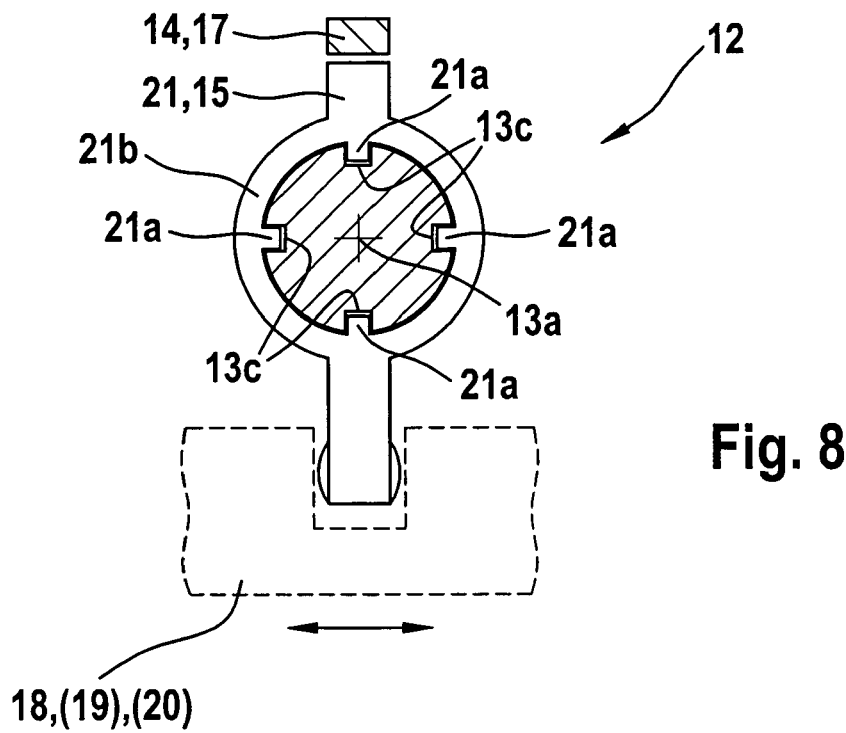
FIG. 8 shows the cross section of the device according to FIG. 7, sectioned along the line VIII-VIII.

FIGS. 7 and 8 show a shifting device 12 in different views and sectioned differently. The shifting device 12 has a shaft 13, shifting elements 14 and 15 and a bearing element 16. The shifting element 14 is a blocking slide 17 which is held in a rotationally fixed manner with respect to the longitudinal center axis 13a of the shifting shaft in pockets 18a, 19a, 20a of shifting rails 18, 19, 20. The shifting element 15 is a shifting finger 21 engaging in a form-fitting manner in the pivoting direction of the shaft 13. The form-fitting connection between the shifting finger 21 and the shaft 13 is produced via a profiled shaft and hub connection. For this purpose, keys 21a, which are directed radially inward toward the longitudinal axis 13a, on the shaft 21b of the shifting finger 21 engage in longitudinal grooves 13c on the shaft 13, which longitudinal grooves run longitudinally with the longitudinal center axis 13a. A shaft 24 designed as an alternative to the shaft 13 is illustrated by FIG. 6. In this case, the extruded profile of the shaft 24 differs from the shaft 13 by the design of the key grooves 24a.

The shaft 13 is pivotable in the bearings 22 and also relative to the blocking slide 17. The shifting finger 21 pivots together with the shaft 13 and, in the process, depending in each case on its position, displaces one of the shifting rails 18, 19 or 20 in the directions indicated in FIG. 8 by a double arrow.

The blocking slide 17 is supported axially in the one direction of extension of the longitudinal center axis 13a by means of a shoulder 13b of the shaft 13. The blocking slide 17 is fixed in the other direction of extension by means of the bearing element 16 of the bearing 22, which bearing element is designed as an inner ring 22a. The bearing 22 is a radial bearing and has rollers 23 or needles.

The shifting finger 21 is held in the directions of extension of the longitudinal center axis 13a by the blocking slide 17, but is pivotable together with the shaft 13 relative to the blocking slide 17. When a gate in the shift transmission is selected, the shaft 13 is displaced along the longitudinal center axis 13a by the blocking slide. In this case, the blocking slide 17 carries along the shifting finger 21 until the shifting finger 21 engages in one of the pockets 18a, 19a or 20a of the shifting rails 18, 19, 20. The inner ring 22*a* moves longitudinally through the radial bearing 22 longitudinally with respect to the rollers 23.

The invention claimed is:

1. A shifting device comprising:
   a shaft having a longitudinal axis;
   at least one shifting element positioned on the shaft, the at least one shifting element protruding transversely from the longitudinal axis of the shaft away from the shaft in at least one direction, and the at least one shifting element being fixed longitudinally on the shaft in mutually opposite directions of extension of the longitudinal axis;
   a bearing supporting the shaft;
   the shaft being transversely supported in the bearing with respect to the longitudinal axis, and the shaft being mounted moveably in the bearing;
   at least one bearing element positioned at the bearing and longitudinally securing the at least one shifting element in at least one of the directions of extension, and the at least one bearing element being moveable in the bearing, engaging around the longitudinal axis, being seated fixedly on the shaft and being supported in the bearing.

2. The shifting device as claimed in claim 1, wherein the at least one shifting element is seated on the shaft in a form-fitting manner about the longitudinal axis and is rotationally fixed with respect to the shaft.

3. The shifting device as claimed in claim 2, further comprising a profiled shaft and hub connection connecting the at least one shifting element to the shaft.

4. The shifting device as claimed in claim 3, further comprising:
   a hub engaging the at least one shifting element around the shaft; and
   at least one key formed with the at least one shifting element and protruding from the hub in the direction of the longitudinal axis, a longitudinal groove in the shaft, and the at least one shifting element engages with the at least one key in the longitudinal groove, wherein the at least one key engages in the longitudinal groove, and the at least one key corresponds with the longitudinal groove in a form-fitting manner at least in the circumferential direction.

5. The shifting device as claimed in claim 3, the at least one shifting element comprising at least two shifting elements arranged adjacent to one another on the shaft and being secured by the at least one bearing element.

6. The shifting device as claimed in claim 3, wherein the at least one shifting element is directed away transversely from the longitudinal axis at least in a first direction, and at least one other shifting element is directed transversely away from the longitudinal axis in at least a second direction different from the first direction.

7. The shifting device as claimed in claim 1, wherein the at least one shifting element has at least one shifting finger.

8. The shifting device as claimed in claim 1, the at least one bearing element comprising two bearing elements lying opposite each other on the shaft and holding the at least one shifting element between the two bearing elements.

9. The shifting device as claimed in claim 1, wherein the at least one bearing element comprises an inner ring of the bearing, the at least one bearing element positioned to support the shaft radially.

10. The shifting device as claimed in claim 9, wherein the inner ring has a circumference with a track and trochoidal rolling contact bodies of the bearing positioned in the track.

11. The shifting device as claimed in claim 10, wherein the inner ring is displaceable in the bearing at least in the directions of extension.

12. The shifting device as claimed in claim 1, wherein the at least one bearing element is an inner ring of a combined bearing for mounting the shaft, and the at least one bearing element is moveable longitudinally in at least one of the directions of extension and is pivotable about the longitudinal axis.

\* \* \* \* \*